United States Patent
Yang (10) Patent No.: US 8,208,571 B1
(45) Date of Patent: Jun. 26, 2012

(54) METHOD FOR DETECTING A PERIODIC SIGNAL

(75) Inventor: Zhiyu Yang, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/175,476

(22) Filed: Jul. 1, 2011

Related U.S. Application Data (63) Continuation of application No. 11/775,605, filed on Jul. 10, 2007, now Pat. No. 7,974,351.

(60) Provisional application No. 60/822,604, filed on Aug. 16, 2006.

(51) Int. Cl.
  *H04K 1/10* (2006.01)
  *H04L 27/00* (2006.01)
  *H04J 13/00* (2006.01)
(52) U.S. Cl. .................. 375/260; 375/326; 370/479
(58) Field of Classification Search .............. 375/260, 375/326; 370/479
  See application file for complete search history.

(56) References Cited

U.S. PATENT DOCUMENTS

| | | | | |
|---|---|---|---|---|
| 4,561,089 A * | 12/1985 | Rouse et al. | .................. | 370/479 |
| 4,567,588 A * | 1/1986 | Jerrim | .................. | 370/479 |
| 4,644,523 A * | 2/1987 | Horwitz | .................. | 370/479 |
| 5,751,466 A | 5/1998 | Dowling et al. | | |
| 6,028,693 A | 2/2000 | Fork et al. | | |
| 6,108,317 A * | 8/2000 | Jones et al. | .................. | 370/320 |
| 7,136,432 B2 * | 11/2006 | Min et al. | .................. | 375/326 |
| 7,428,086 B2 | 9/2008 | Dufour et al. | | |
| 7,480,234 B1 * | 1/2009 | Hart et al. | .................. | 370/208 |
| 2002/0057717 A1 * | 5/2002 | Mallory | .................. | 370/503 |
| 2005/0220222 A1 | 10/2005 | Marsili | | |
| 2006/0002485 A1 | 1/2006 | Moher | | |
| 2006/0199558 A1 | 9/2006 | Chiodini et al. | | |
| 2007/0230403 A1 | 10/2007 | Douglas et al. | | |

OTHER PUBLICATIONS

Nandula, "Robust Timing Synchronization for OFDM Based Wireless LAN System," IEEE Conference on Convergent Technologies for Asia-Pacific Region, vol. 4, p. 1558-61, Oct. 15-17, 2003.

* cited by examiner

*Primary Examiner* — David C. Payne
*Assistant Examiner* — Sarah Hassan (57) ABSTRACT

In detecting a signal, angle information is generated based on a complex signal having a periodic portion. An autocorrelation signal is generated based on the angle information and not based on magnitude information associated with the complex signal. The periodic portion is detected based on the autocorrelation signal.

20 Claims, 8 Drawing Sheets

FIG. 1A

PRIOR ART

FIG. 1B

PRIOR ART

FIG. 2

PRIOR ART

METHOD FOR DETECTING A PERIODIC SIGNAL

CROSS-REFERENCES TO RELATED APPLICATIONS

The present disclosure is a continuation of U.S. application Ser. No. 11/775,605, filed on Jul. 10, 2007, now U.S. Pat. No. 7,974,351, which claims priority under 35 U.S.C §119(e) to U.S. Provisional Application No. 60/822,604, filed on Aug. 16, 2006.

FIELD OF TECHNOLOGY

The present disclosure relates generally to communication systems, and more particularly, to detecting a transmitted signal.

DESCRIPTION OF THE RELATED ART

In some communication systems, a known pattern of symbols is used to indicate the beginning of a block of transmitted information, such as a transmitted packet. This facilitates the detection of the beginning of the block. In present wireless local area network (WLAN) systems, for example, transmitters transmit packets having preambles. These preambles include a periodic pattern of symbols. In such systems, a receiver may monitor the received signal in order to detect packets. In particular, the receiver may process the received signal to detect the preamble of a packet which indicates the beginning of the packet.

Figure 1A:
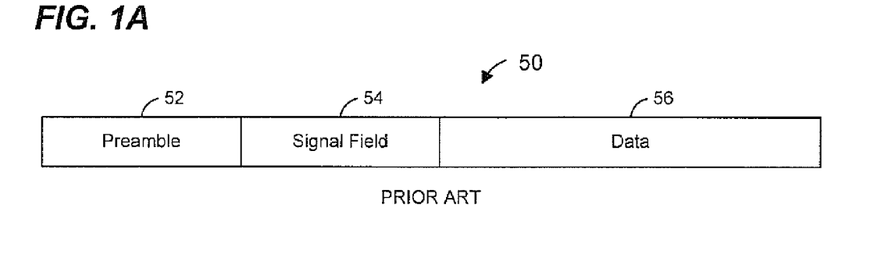
FIG. 1A is a diagram illustrating a packet according to the IEEE 802.11a wireless local area network (WLAN) standard.
Figure 1B:
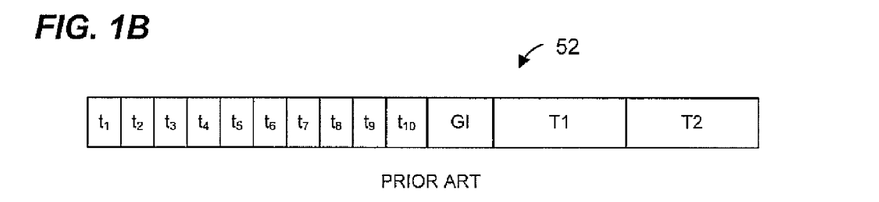
FIG. 1B is a diagram illustrating the preamble field of the packet of FIG. 1A.

As an example, the IEEE 802.11a WLAN standard specifies a protocol for WLAN systems and includes the use of periodic patterns of symbols to facilitate signal detection. According to the IEEE 802.11a WLAN standard, data is transmitted in packets, and the format of such packets is illustrated in FIGS. 1A and 1B. FIG. 1A is an illustration of an IEEE 802.11a packet 50 that includes a preamble field 52, a signal field 54, and a data field 56. The signal field 54 includes information regarding the rate and length of the packet. The data field 56 includes data to be transmitted.

FIG. 1B is an illustration of the preamble field 52 of FIG. 1A. The preamble field 52 includes ten short symbols ($t_1, t_2, \ldots, t_{10}$) and two long symbols (T1 and T2), separated by a guard interval (GI). Each of the short symbols is identical. Thus, the preamble 52 includes a periodic signal with ten cycles (i.e., $t_1, t_2, \ldots, t_{10}$).

Figure 2:
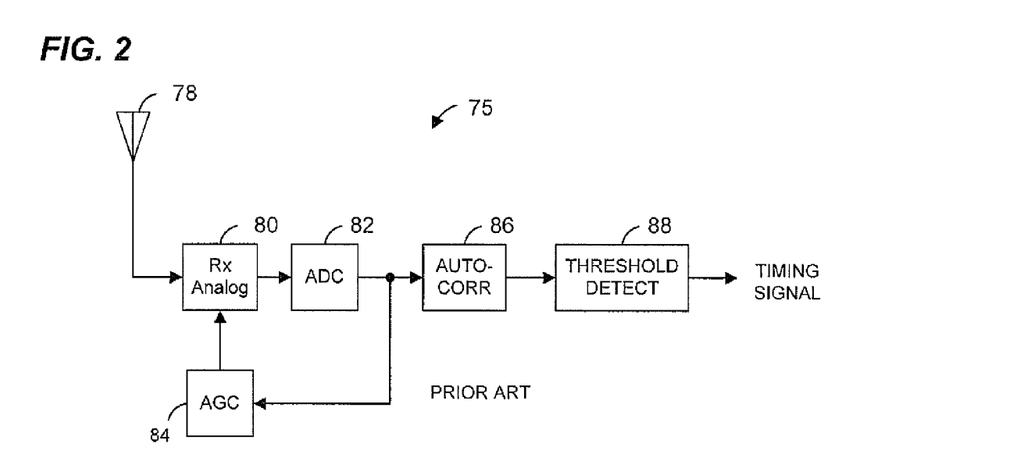
FIG. 2 is a portion of a prior art receiver arranged to detect a periodic signal in a received signal.

In commonly used preamble detection techniques, autocorrelation is utilized to distinguish a known periodic signal from noise or data. FIG. 2 is a block diagram of a portion 75 of a WLAN receiver with a typical signal detection system. An antenna 78 is coupled to an analog receiver portion 80 that generates a baseband or near baseband analog signal. The output of the analog receiver portion 80 is coupled to an input of an analog-to-digital converter (ADC) 82, which generates a digital signal. The output of the ADC 82 is coupled to an automatic gain control (AGC) system 84, which generates a control signal for adjusting the gain of the analog receiver portion 80. For example, the analog receiver portion 80 may include a variable gain amplifier having a control input coupled to the control signal generated by the AGC system 84. An output of the variable gain amplifier may be coupled to the input of the ADC 82. Additionally, the output of the ADC 82 is coupled to an autocorrelator 86 that generates an autocorrelation signal. An output of the autocorrelator 86 is coupled to a threshold detector 88, which detects whether the signal at its input passes a threshold. The threshold detector 88 generates a timing signal that may be used to synchronize with packets received by the receiver 75.

Figure 3:
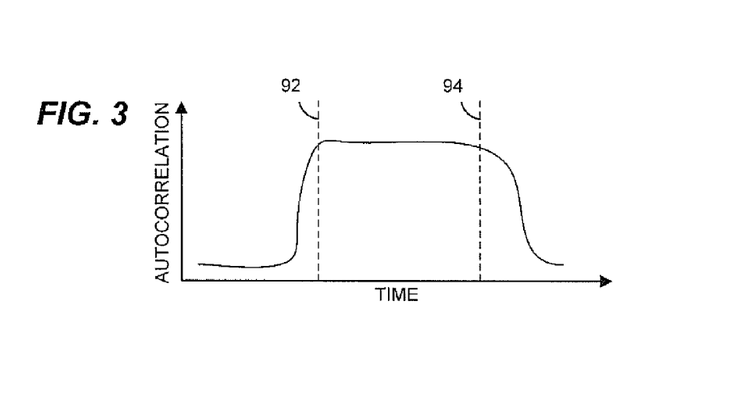
FIG. 3 is a graph of the output of the autocorrelator of FIG. 2 associated with the receipt of an IEEE 802.11a packet.

The autocorrelator 86 generates an autocorrelation of the signal provided at its input with a delayed copy of the signal. FIG. 3 is a graph of the output of the autocorrelator 86 associated with the receipt of an 802.11a packet. The beginning of the preamble field 52 is indicated by the line 92 and the end of the short symbol $t_{10}$ is indicated by the line 94.

SUMMARY OF THE DISCLOSURE

In one embodiment, a method for detecting a signal comprises generating angle information based on a complex signal having a periodic portion, and generating an autocorrelation signal based on the angle information and not based on magnitude information associated with the complex signal. The method also comprises detecting the periodic portion based on the autocorrelation signal.

In another embodiment, a system for detecting a signal includes an angle quantizer having an input to receive a complex signal having a periodic portion. The system also includes an autocorrelator having an input coupled to an output of the angle quantizer, the autocorrelator to generate an autocorrelation signal based on the output of the angle quantizer and not based on magnitude information associated with the complex signal. Additionally, the system includes a detector having an input coupled to an output of the autocorrelator, the detector to detect the periodic portion based on the autocorrelation signal.

In yet another embodiment, a method for detecting a signal comprises generating a plurality of angle information signals based on a plurality of complex signals corresponding to a plurality of antennas of a receiver, each complex signal corresponding to an information signal having a periodic portion. The method additionally comprises generating a plurality of autocorrelation signals based on the plurality of angle information signals and not based on magnitude information associated with the complex signals. Also, the method comprises summing the plurality of autocorrelation signals to generate a summed autocorrelation signal, and detecting the periodic portion based on the summed autocorrelation signal.

In still another embodiment, a system for detecting a signal includes a plurality of angle quantizers, each angle quantizer having an input to receive a corresponding complex signal corresponding to a respective antenna of a plurality of antennas, each complex signal corresponding to an information signal having a periodic portion. The system also includes a plurality of autocorrelators, each autocorrelator having an input coupled to an output of a corresponding one of the angle quantizers, each autocorrelator to generate a respective autocorrelation signal based on the output of the corresponding angle quantizer and not based on magnitude information associated with the complex signal. Additionally, the system includes a summing device coupled to the plurality of autocorrelators, the summing device to add the outputs of the autocorrelators to generate a summed autocorrelation signal. The system further includes a detector having an input coupled to an output of the summing device, the detector to detect the periodic portion based on the summed autocorrelation signal.

DETAILED DESCRIPTION

Figure 4:
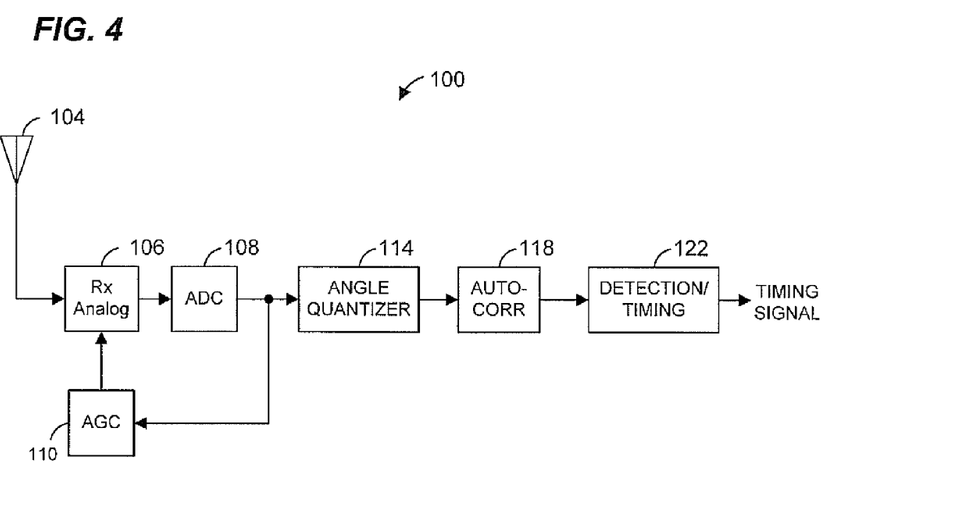
FIG. 4 is a block diagram of a portion of an example receiver arranged to detect a transmitted signal having a periodic portion.

FIG. 4 is a block diagram of a portion of an example receiver 100 arranged to detect a transmitted signal having periodic portion. For instance, the receiver 100 could be used in a wireless local area network (WLAN) operating according to the IEEE 802.11a WLAN standard, the IEEE 802.11g WLAN standard, or the IEEE 802.11n WLAN draft standard, or some other standard. The receiver 100 comprises an antenna 104 coupled to an analog receiver portion 106 that generates a baseband or near baseband analog signal. The output of the analog receiver portion 106 is a complex analog signal. For example, the output of the analog receiver portion 106 may include an in-phase analog signal and a quadrature analog signal.

The output of the analog receiver portion 106 is coupled to an input of an analog-to-digital converter (ADC) 108, which generates a digital signal. The output of the ADC 108 is a complex digital signal. For example, the output of the ADC 108 may include an in-phase digital signal and a quadrature digital signal. The output of the ADC 108 is coupled to an automatic gain control (AGC) system 110, which generates a control signal for adjusting the gain of the analog receiver portion 106.

Figure 5A:
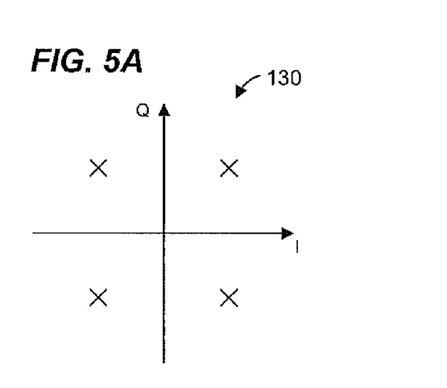
FIG. 5A is a diagram of a four-point constellation to which the angle quantizer 114 of FIG. 4 may quantize a complex digital.
Figure 5B:
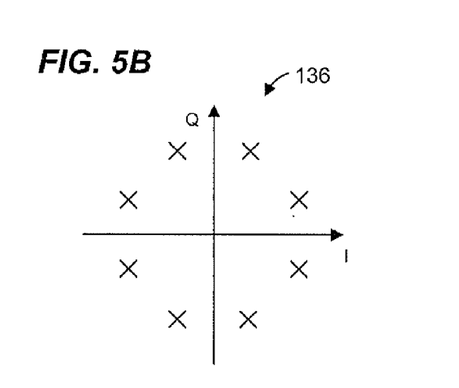
FIG. 5B is a diagram of an eight-point constellation to which the angle quantizer 114 of FIG. 4 may quantize a complex digital.
Figure 5C:
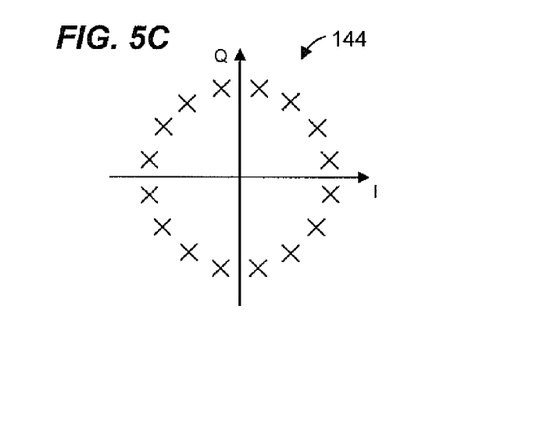
FIG. 5C is a diagram of a sixteen-point constellation to which the angle quantizer 114 of FIG. 4 may quantize a complex digital.

Additionally, the output of the ADC 108 is coupled to an input of an angle quantizer 114. The angle quantizer 114 determines angle information associated with the complex digital signal at its input, and generates an angle information output. The angle quantizer 114 may, in effect, quantize the complex digital signal to a plurality of constellation points corresponding to a fixed magnitude complex signal. The number of constellation points to which the angle quantizer 114 quantizes the complex digital signal may vary depending upon the implementation. For example, some implementations may require more precision than others, and thus may require more points in the constellation. FIGS. 5A-5C show examples of constellations to which the angle quantizer 114 quantizes the complex digital signal. It is to be understood, however, that different constellations may also be used, including constellations with more points than shown in FIGS. 5A-5C and/or different constellations (e.g., constellation rotated from those shown in FIGS. 5A-5C. Because the constellation points correspond to complex numbers having a same known magnitude, the output of the angle quantizer 114 may be represented merely as angles.

FIG. 5A is a diagram of a four-point constellation 130 to which the angle quantizer 114 may quantize the complex digital. For the constellation 130, the angle quantizer 114 may quantize a signal sample having I and Q components to one of four constellation points by making two comparisons:

$I>0?$ $Q>0?$

Thus, the angle quantizer 114 may comprise a comparator that compares I to zero and Q to zero, or it may comprise two comparators: a first comparator to compare I to zero and a second comparator to compare Q to zero.

FIG. 5B is a diagram of an eight-point constellation 136 to which the angle quantizer 114 may quantize the complex digital. For the constellation 136, the angle quantizer 114 may quantize a signal sample having I and Q components to one of eight constellation points by making three comparisons:

$I>0?$ $Q>0?$ $|I|>|Q|?$

Thus, the angle quantizer 114 may comprise one or more comparators that compare I to zero, Q to zero, and the magnitude of I to the magnitude of Q. For example, it may comprise three comparators: a first comparator to compare I to zero, a second comparator to compare Q to zero, and a third comparator to compare the magnitude of I to the magnitude of Q. Or, it may comprise two comparators: a first comparator to compare I to zero and to compare Q to zero, and a second comparator to compare the magnitude of I to the magnitude of Q.

FIG. 5C is a diagram of a sixteen-point constellation 144 to which the angle quantizer 114 may quantize the complex digital. For the constellation 144, the angle quantizer 114 may quantize a signal sample having I and Q components to one of sixteen constellation points by making four comparisons:

$I>0?$ $Q>0?$ $|I|>|Q|?$ $\tan(22.5°)*\max(|I|,|Q|)>\min(|I|,|Q|)?$

Thus, the angle quantizer 114 may comprise one or more comparators that compare I to zero, Q to zero, the magnitude of I to the magnitude of Q, and a coefficient multiplied with the maximum of the magnitude of I and the magnitude of Q to the minimum of the magnitude of I and the magnitude of Q.

The coefficient tan(22.5°) may be approximated to reduce costs of the angle quantizer 114, for example.

An autocorrelator 118 has an input coupled to the output of the angle quantizer 114 and generates an autocorrelation signal based on the angle information and not based on magnitude information associated with the complex signal output of the ADC 108. Because of this, the autocorrelator 118 operates on data that is not affected, or is minimally affected by the operation of the AGC 110 as compared to magnitude information. Additionally, the angle information may be assumed to correspond with complex signals having a same magnitude. Thus, multiplication of such signals comprises merely adding angles. Thus, at least in some implementations of the autocorrelator 118, the use of multipliers may be avoided.

A detection and/or timing block 122 has an input coupled to the output of the autocorrelator 118. The detection and/or timing block 122 generates one or more timing signals based on the autocorrelation signal generated by the autocorrelator 118. The one or more timing signals may include a signal indicative of the detection of the periodic signal. The one or more timing signals also may include a signal indicative of the start of a portion of a packet. As just one example, with regard to the IEEE 802.11a WLAN standard, the detection and/or timing block 122 may generate a signal indicative of the end of the short symbol $t_{10}$, and thus indicate the beginning of the GI of the preamble. Generating the signal indicative of the end of the short symbol $t_{10}$ may include detecting the end of the short symbol $t_{10}$ or detecting the beginning of the short symbol $t_1$ and then calculating the end of the short symbol $t_{10}$ based on the length of the ten short symbols $t_1$, $t_2$, ..., $t_{10}$, for example. Additionally or alternatively, the detection and/or timing block 122 may generate a signal indicative of other portions of the preamble, such as the beginning of the preamble, the beginning of the short symbol $t_{10}$, and/or the beginning or ending of any of the other short symbols. Generation of the one or more timing signals may be accomplished using a variety of techniques, including known techniques. For instance, a magnitude of the autocorrelation could be compared to a threshold. Generation of a detection signal could be based on when the magnitude of the autocorrelation signal exceeded the threshold. Similarly, generation of a timing signal could be based on when the magnitude of the autocorrelation signal then fell below the same threshold or some other threshold. Of course, generation of the one or more timing signals could be based on additional information as well, such as a cross-correlation signal generated based on the angle information or the output of the ADC 108, for example. For instance, a cross-correlation with a signal portion known to be in a preamble could be utilized.

Figure 6:
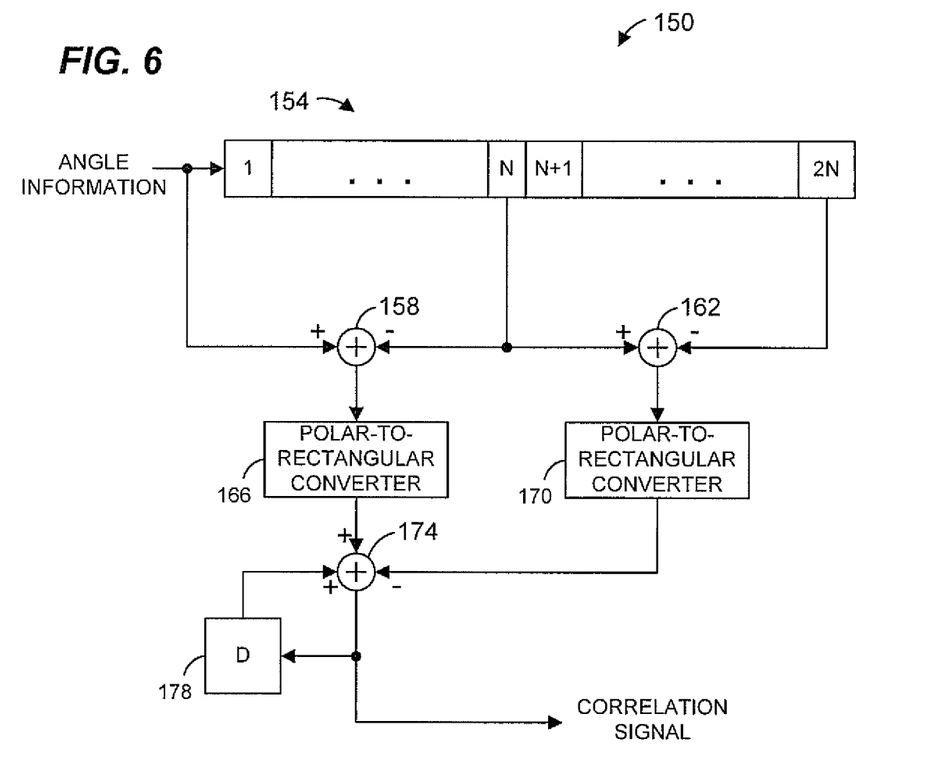
FIG. 6 is a block diagram of an example autocorrelator that may be utilized with the receiver portion of FIG. 4.

FIG. 6 is a block diagram of an example autocorrelator 150 that may be used with a receiver such as the receiver 100. An autocorrelation A at a time index k may be expressed as:

$$A(k) = \sum_{i=k-N+1}^{k} s(i)s^*(i-N) \qquad \text{Equ. 1}$$

where s is a complex signal, s* is the complex conjugate of s, and N is the period of the periodic signal in s that is to be detected. Equation 1 can be rewritten as:

$$A(k) = \sum_{i=-\infty}^{k} [s(i)s^*(i-N) - s(i-N)s^*(i-2N)] \qquad \text{Equ. 2}$$

The autocorrelator 150 calculates Equation 2 as will be described in more detail below.

The autocorrelator 150 includes a delay line 154 that receives angle information, such as angle information from an angle quantizer. The autocorrelator 150 also includes an adding device 158 and an adding device 162. The adding device 158 has a first input coupled to the input of the delay line 154 and a second input coupled to an Nth element of the delay line 154. The adding device 158 is configured to generate a subtraction of the second input from the first input. Because the information in the delay line 154 corresponds to angle information associated with a complex signal, the operation of the adding device 158 corresponds to a multiplication of a complex digital signal with a complex conjugate of the complex digital signal sample delayed by N samples. The output of the adding device 158 corresponds to the term s(i)s*(i–N) term in Equation 2.

Similarly, the adding device 162 has a first input coupled to the Nth element of the delay line 154 and a second input coupled to a 2Nth element of the delay line 154. The adding device 162 is configured to generate a subtraction of the second input from the first input. This corresponds to a multiplication of a complex digital signal sample delayed by N samples with a complex conjugate of the complex digital signal sample delayed by 2N samples. The output of the adding device 162 corresponds to the term s(i–N)s*(i–2N) term in Equation 2.

The output of the adding device 158 is coupled to an input of a polar-to-rectangular converter 166. The polar-to-rectangular converter 166 converts the output of the adding device 158, which is indicative of an angle of a complex number, to a complex value having a real component and an imaginary component. The polar-to-rectangular converter 166 assumes that the angle information from the output of the adding device 158 corresponds to complex numbers all having the same known magnitude. Similarly, the output of the adding device 162 is coupled to an input of a polar-to-rectangular converter 170, which maps the output of the adding device 162, which is indicative of an angle of a complex number, to a complex value having a real component and an imaginary component.

The autocorrelator 150 further includes an adding device 174. The adding device 174 includes a first input coupled to an output of a delay element 178. An input of the delay element is coupled to an output of the adding device 174. The adding device 174 also includes a second input coupled to an output of the polar-to-rectangular converter 166 and a third input coupled to an output of the polar-to-rectangular converter 170. The adding device 174 is configured to subtract the complex value output of the polar-to-rectangular converter 170 from the complex value output of the polar-to-rectangular converter 166. This corresponds to the subtraction of the s(i–N)s*(i–2N) term from the s(i)s*(i–N) term in Equation 2. Additionally, the adding device 174 is configured to add the result of the subtraction of the s(i–N)s*(i–2N) term from the s(i)s*(i–N) to the output of the delay element 178. This corresponds to the summation in Equation 2.

The output of the autocorrelator 150 is a complex value signal. As discussed above, this value may be used to generate one or more timing signals indicative of the start of a portion of a packet. For instance, a magnitude of the autocorrelation could be compared to a threshold.

Figure 7:
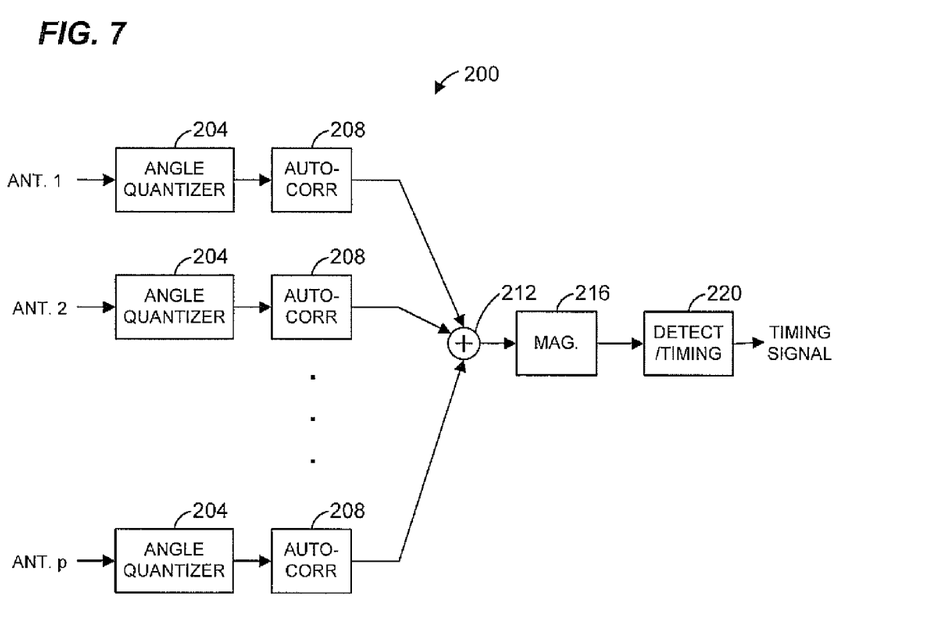
FIG. 7 is block diagram of a portion of an example multiple-input, multiple-output (MIMO) receiver arranged to detect a transmitted signal having a periodic portion.

The techniques described above can be utilized in other types of WLAN systems as well, such as multiple-input, multiple-output (MIMO) systems. FIG. 7 is a block diagram of an example system 200 for use in detecting a periodic signal in a MIMO receiver having p antennas. The system 200 includes a plurality of angle quantizers 204, each receiving a complex digital signal corresponding to a respective antenna of the MIMO receiver. Outputs of the angle quantizers 204 are coupled to corresponding inputs of autocorrelators 208. Outputs of the autocorrelators 208 are coupled to a plurality of inputs of an adding device 212 that adds together all of the outputs of the autocorrelators 208. An output of the adding device 212 is coupled to an input of a magnitude generator 216, which generates a magnitude corresponding to the output of the adding device 212.

An output of the magnitude generator 216 is coupled to an input of a detection/timing block 220. The detection and/or timing block 220 generates one or more timing signals based on the signal generated by the magnitude generator 216. The one or more timing signals may include a signal indicative of the detection of the periodic signal. The one or more timing signals also may include a signal indicative of the start of a portion of a packet. As just one example, the detection and/or timing block 220 may generate a signal indicative of the beginning or end of a periodic signal portion, and thus indicate the beginning of a next portion of a packet. Generation of the one or more timing signals may be accomplished using a variety of techniques, including known techniques. For instance, the output of the magnitude generator 216 could be compared to a threshold. Generation of a detection signal could be based on when the output of the magnitude generator 216 exceeded the threshold. Similarly, generation of a timing signal could be based on when the output of the magnitude generator 216 then fell below the same threshold or some other threshold. Of course, generation of the one or more timing signals could be based on additional information as well, such as cross-correlation signals generated based on the outputs of the angle quantizers 204 or the inputs of the angle quantizers 204, for example. For instance, a cross-correlation with a signal portion known to be in a preamble could be utilized.

The above-described techniques can be utilized in a variety of contexts in which signals having a periodic portion are to be detected. For instance, the above-described techniques can be utilized in WLAN systems, such as WLAN systems that operate according to the IEEE 802.11a WLAN standard, the IEEE 802.11g WLAN standard, or the IEEE 802.11n WLAN draft standard, as well as other types of the WLAN standards. Additionally, the above-described techniques can be utilized in a variety of wired, wireless, optical, etc., communication systems besides WLAN systems. Moreover, the above-described techniques can be utilized for detecting data stored on a computer-readable medium such as magnetic disks, optical disks, etc., in which the stored data includes periodic portions such as in guard intervals, preambles, servo marks, etc. More generally, such a periodic signal detector may be utilized in a variety of electronic devices such as communication devices, computation devices, storage devices, networking devices, measurement devices, etc. Referring now to FIGS. 7A-7H, a few specific examples of devices that may utilize a periodic signal detector apparatus and/or method such as described above will be described.

Figure 8A:
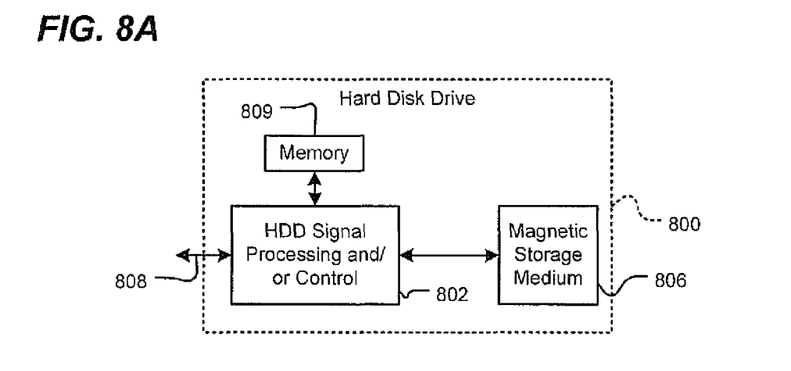
FIG. 8A is a block diagram of a hard disk drive system that may utilize a periodic signal detector.

For example, referring to FIG. 8A, a hard disk drive 800 may include a periodic signal detector, which may be implemented by signal processing and/or control circuits, which are generally identified in FIG. 8A at 802. In some implementations, signal processing and/or control circuit 802 and/or other circuits (not shown) in HDD 800 may process data, perform coding and/or encryption, perform calculations, and/or format data that is output to and/or received from a magnetic storage medium 806.

HDD 800 may communicate with a host device (not shown) such as a computer, mobile computing devices such as personal digital assistants, mobile phones, media or MP3 players and the like, and/or other devices via one or more wired or wireless communication links 808. HDD 800 may be connected to memory 809, such as random access memory (RAM), nonvolatile memory such as flash memory, read only memory (ROM) and/or other suitable electronic data storage.

Figure 8B:
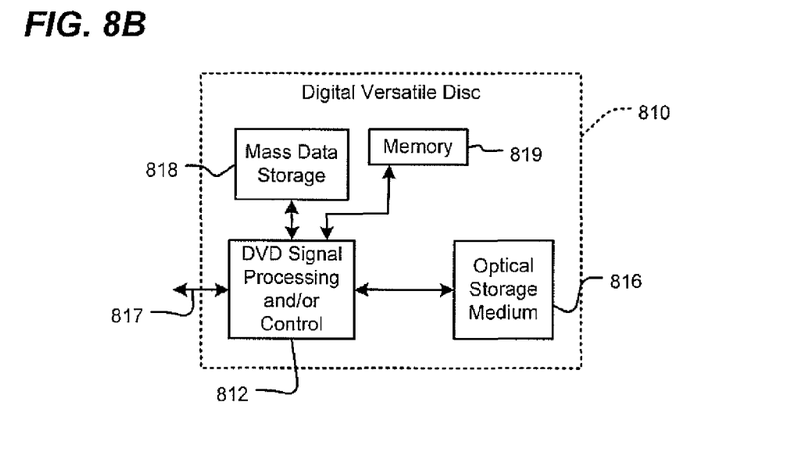
FIG. 8B is a block diagram of a digital versatile drive system that may utilize a periodic signal detector.

Referring now to FIG. 8B, a periodic signal detector may be utilized in a digital versatile disc (DVD) drive 810. The periodic signal detector may be implemented by either or both signal processing and/or control circuits, which are generally identified in FIG. 8B at 812, and/or mass data storage 818 of DVD drive 810. Signal processing and/or control circuit 812 and/or other circuits (not shown) in DVD 810 may process data, perform coding and/or encryption, perform calculations, and/or format data that is read from and/or data written to an optical storage medium 816. In some implementations, signal processing and/or control circuit 812 and/or other circuits (not shown) in DVD 810 can also perform other functions such as encoding and/or decoding and/or any other signal processing functions associated with a DVD drive.

DVD drive 810 may communicate with an output device (not shown) such as a computer, television or other device via one or more wired or wireless communication links 817. DVD 810 may communicate with mass data storage 818 that stores data in a nonvolatile manner. Mass data storage 818 may include a hard disk drive (HDD) such as that shown in FIG. 8B. The HDD may be a mini HDD that includes one or more platters having a diameter that is smaller than approximately 1.8". DVD 810 may be connected to memory 819, such as RAM, ROM, nonvolatile memory such as flash memory, and/or other suitable electronic data storage.

Figure 8C:
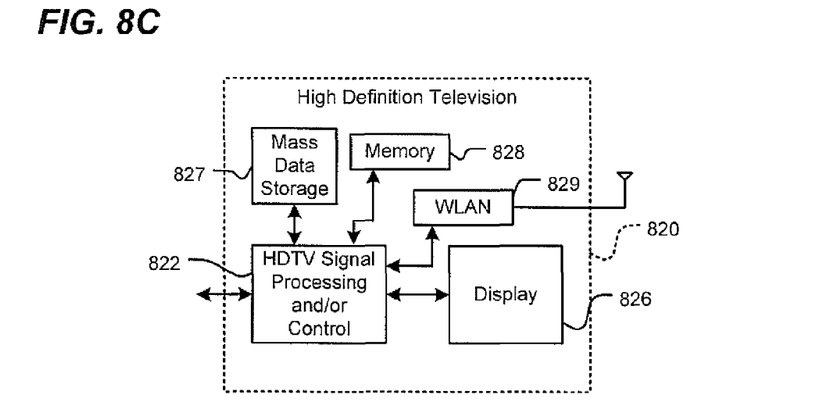
FIG. 8C is a block diagram of a high definition television that may utilize a periodic signal detector.

Referring to FIG. 8C, a periodic signal detector may be utilized in a high definition television (HDTV) 820. The HDTV 820 includes signal processing and/or control circuits, which are generally identified in FIG. 8C at 822, a WLAN interface 829, and a mass data storage 827. The periodic signal detector may be utilized in the WLAN interface 829 or the signal processing circuit and/or control circuit 822, for example. HDTV 820 receives HDTV input signals in either a wired or wireless format and generates HDTV output signals for a display 826. In some implementations, signal processing circuit and/or control circuit 822 and/or other circuits (not shown) of HDTV 820 may process data, perform coding and/or encryption, perform calculations, format data and/or perform any other type of HDTV processing that may be required.

HDTV 820 may communicate with mass data storage 827 that stores data in a nonvolatile manner such as optical and/or magnetic storage devices. The mass data storage 827 may include one or more hard disk drives (HDDs) and/or one or more digital versatile disks (DVDs). At least one HDD may have the configuration shown in FIG. 8A and/or at least one DVD may have the configuration shown in FIG. 8B. One or more of the HDDs may be a mini HDD that includes one or more platters having a diameter that is smaller than approximately 1.8". HDTV 820 may be connected to memory 828 such as RAM, ROM, nonvolatile memory such as flash memory and/or other suitable electronic data storage. HDTV 820 also may support connections with a WLAN via a WLAN network interface 829.

Figure 8D:
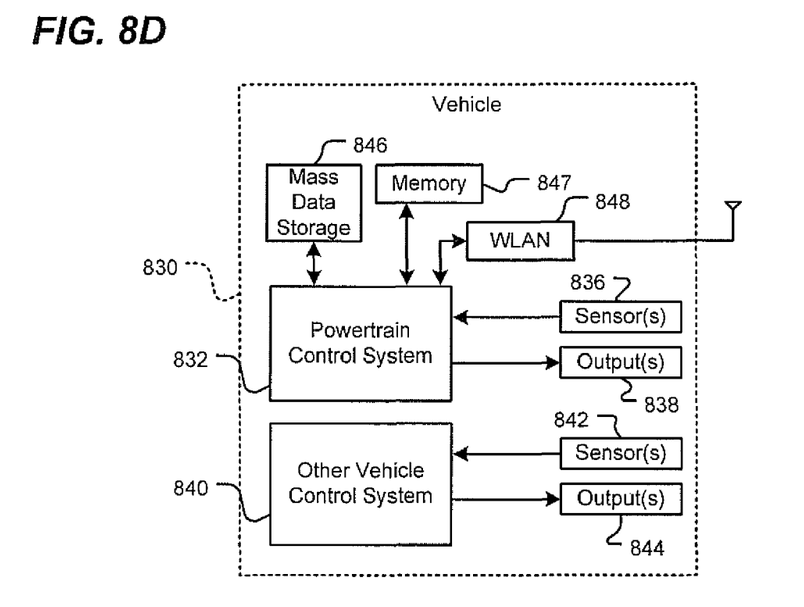
FIG. 8D is a block diagram of a vehicle that may utilize a periodic signal detector.

Referring now to FIG. 8D, a periodic signal detector may be utilized in a control system of a vehicle 830. In some implementations, the periodic signal detector may be implemented by a powertrain control system 832 that receives inputs from one or more sensors 836 such as temperature sensors, pressure sensors, rotational sensors, airflow sensors and/or any other suitable sensors and/or that generates one or more output control signals 838 such as engine operating parameters, transmission operating parameters, and/or other control signals.

The periodic signal detector may also be implemented in other control systems 840 of vehicle 830. Control system 840 may likewise receive signals from input sensors 842 and/or output control signals to one or more output devices 844. In some implementations, control system 840 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 832 may communicate with mass data storage 846 that stores data in a nonvolatile manner. Mass data storage 846 may include optical and/or magnetic storage devices for example hard disk drives HDD and/or DVDs. At least one HDD may have the configuration shown in FIG. 8A and/or at least one DVD may have the configuration shown in FIG. 8B. One or more of the HDDs may be a mini HDD that includes one or more platters having a diameter that is smaller than approximately 1.8". Powertrain control system 832 may be connected to memory 847 such as RAM, ROM, nonvolatile memory such as flash memory and/or other suitable electronic data storage. Powertrain control system 832 also may support connections with a WLAN via a WLAN network interface 848. The periodic signal detector may also be implemented in the WLAN interface 848. The control system 840 may also include mass data storage, memory and/or a WLAN interface (all not shown).

Figure 8E:
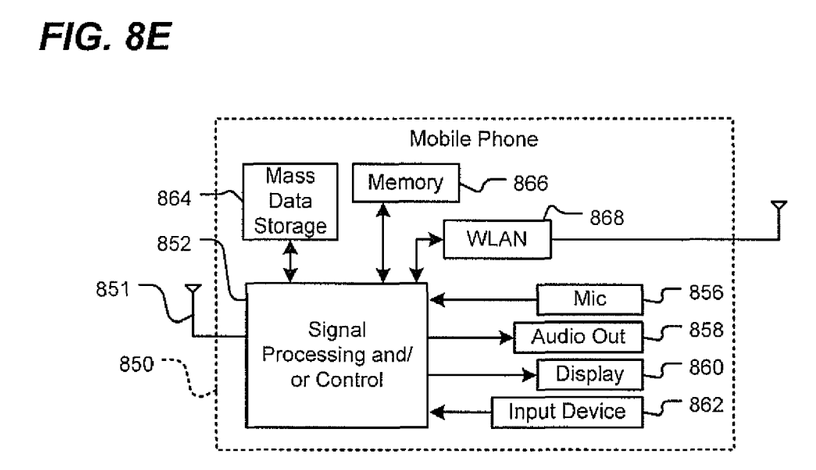
FIG. 8E is a block diagram of a mobile phone that may utilize a periodic signal detector.

Referring now to FIG. 8E, a periodic signal detector may be utilized in a mobile phone 850 (e.g., a cellular phone) that may include an antenna 851. The phone 850 includes signal processing and/or control circuits, which are generally identified in FIG. 8E at 852, a WLAN interface 868, and a mass data storage 864. The periodic signal detector may be implemented in the signal processing and/or control circuits 852 and/or the WLAN interface 868, for example. In some implementations, phone 850 includes a microphone 856, an audio output 858 such as a speaker and/or audio output jack, a display 860 and/or an input device 862 such as a keypad, pointing device, voice actuation and/or other input device. Signal processing and/or control circuits 852 and/or other circuits (not shown) in phone 850 may process data, perform coding and/or encryption, perform calculations, format data and/or perform other phone functions.

Phone 850 may communicate with mass data storage 864 that stores data in a nonvolatile manner such as optical and/or magnetic storage devices for example hard disk drives HDD and/or DVDs. At least one HDD may have the configuration shown in FIG. 8A and/or at least one DVD may have the configuration shown in FIG. 8B. At least one HDD may be a mini HDD that includes one or more platters having a diameter that is smaller than approximately 1.8". Phone 850 may be connected to memory 866 such as RAM, ROM, nonvolatile memory such as flash memory and/or other suitable electronic data storage. Phone 850 also may support connections with a WLAN via a WLAN network interface 868.

Figure 8F:
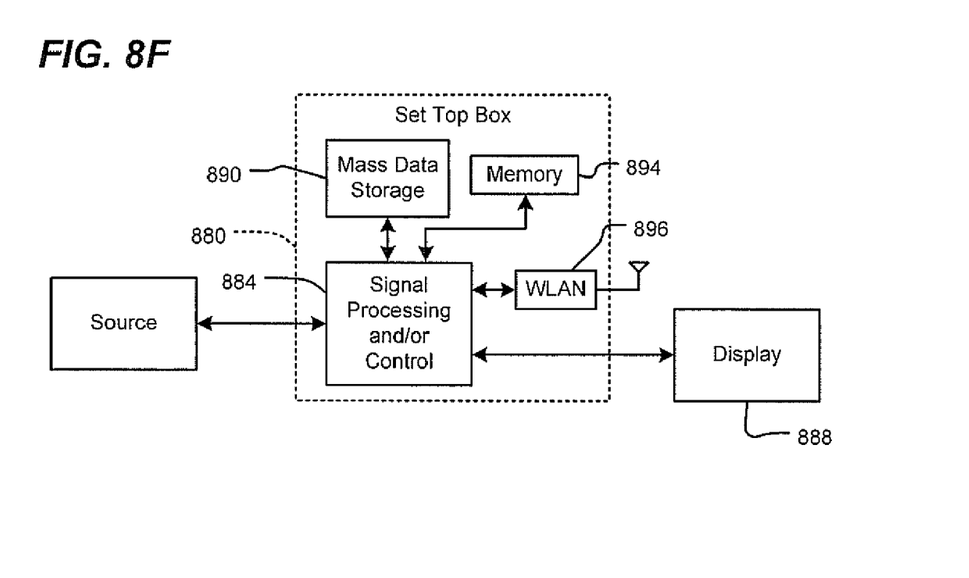
FIG. 8F is a block diagram of a set top box that may utilize a periodic signal detector.

Referring now to FIG. 8F, a periodic signal detector may be utilized in a set top box 880. The set top box 880 includes signal processing and/or control circuits, which are generally identified in FIG. 8F at 884, a WLAN interface 896, and a mass data storage device 890. The periodic signal detector may be implemented in the signal processing and/or control circuits 884 and/or the WLAN interface 896, for example. Set top box 880 receives signals from a source such as a broadband source and outputs standard and/or high definition audio/video signals suitable for a display 888 such as a television and/or monitor and/or other video and/or audio output devices. Signal processing and/or control circuits 884 and/or other circuits (not shown) of the set top box 880 may process data, perform coding and/or encryption, perform calculations, format data and/or perform any other set top box function.

Set top box 880 may communicate with mass data storage 890 that stores data in a nonvolatile manner. Mass data storage 890 may include optical and/or magnetic storage devices for example hard disk drives HDD and/or DVDs. At least one HDD may have the configuration shown in FIG. 8A and/or at least one DVD may have the configuration shown in FIG. 8B. At least one HDD may be a mini HDD that includes one or more platters having a diameter that is smaller than approximately 1.8". Set top box 880 may be connected to memory 894 such as RAM, ROM, nonvolatile memory such as flash memory and/or other suitable electronic data storage. Set top box 880 also may support connections with a WLAN via a WLAN network interface 896.

Figure 8G:
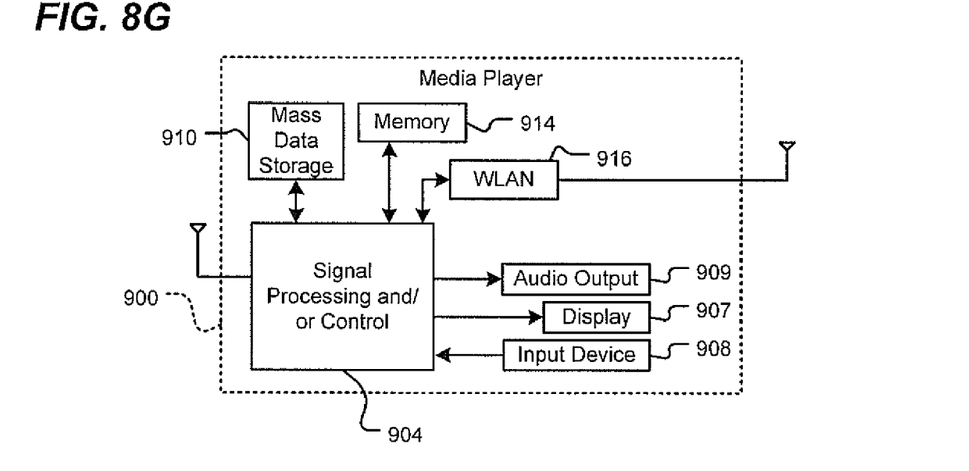
FIG. 8G is a block diagram of a media player that may utilize a periodic signal detector.

Referring now to FIG. 8G, a periodic signal detector may be utilized in a media player 900. The media player 900 may include signal processing and/or control circuits, which are generally identified in FIG. 8G at 904, a WLAN interface 916, and a mass data storage device 910. The periodic signal detector may be implemented in the signal processing and/or control circuits 904 and/or the WLAN interface 916, for example. In some implementations, media player 900 includes a display 907 and/or an input device 908 such as a keypad, touchpad and the like. In some implementations, media player 900 may employ a graphical user interface (GUI) that typically employs menus, drop down menus, icons and/or a point-and-click interface via display 907 and/or input device 908. Media player 900 further includes an audio output 909 such as a speaker and/or audio output jack. Signal processing and/or control circuits 904 and/or other circuits (not shown) of media player 900 may process data, perform coding and/or encryption, perform calculations, format data and/or perform any other media player function.

Media player 900 may communicate with mass data storage 910 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 8A and/or at least one DVD may have the configuration shown in FIG. 8B. At least one HDD may be a mini HDD that includes one or more platters having a diameter that is smaller than approximately 1.8". Media player 900 may be connected to memory 914 such as RAM, ROM, nonvolatile memory such as flash memory and/or other suitable electronic data storage. Media player 900 also may support connections with a WLAN via a WLAN network interface 916. Still other implementations in addition to those described above are contemplated.

Figure 8H:
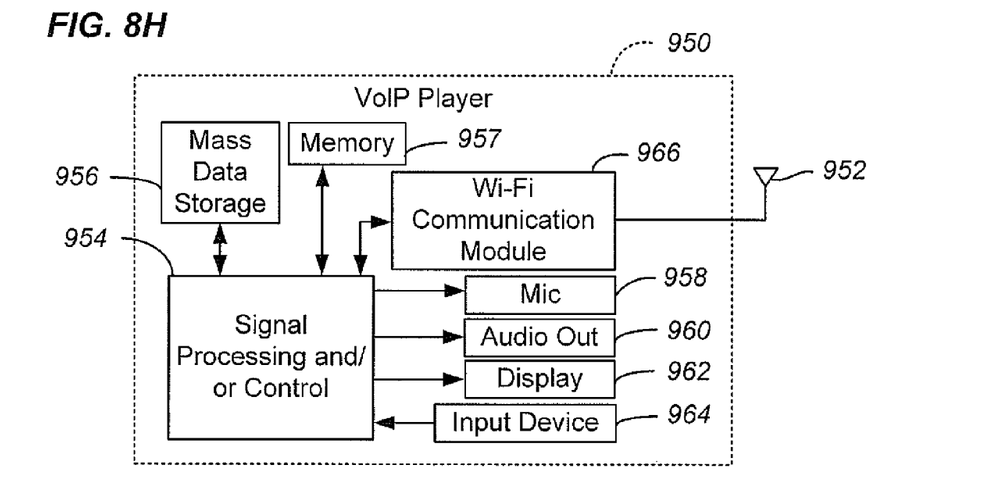
FIG. 8H is a block diagram of a voice over IP device that may utilize a periodic signal detector.

Referring to FIG. 8H, a periodic signal detector may be utilized in a Voice over Internet Protocol (VoIP) phone 950 that may include an antenna 952, signal processing and/or control circuits 954, a wireless interface 966, and a mass data storage 956. The periodic signal detector may be implemented in the signal processing and/or control circuits 954 and/or the wireless interface 966, for example. In some implementations, VoIP phone 950 includes, in part, a microphone 958, an audio output 960 such as a speaker and/or audio output jack, a display monitor 962, an input device 964 such as a keypad, pointing device, voice actuation and/or other input devices, and a Wireless Fidelity (Wi-Fi) communication module 966. Signal processing and/or control circuits 954 and/or other circuits (not shown) in VoIP phone 950 may process data, perform coding and/or encryption, perform calculations, format data and/or perform other VoIP phone functions.

VoIP phone 950 may communicate with mass data storage 956 that stores data in a nonvolatile manner such as optical and/or magnetic storage devices, for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". VoIP phone 950 may be connected to memory 957, which may be a RAM, ROM, nonvolatile memory such as flash memory and/or other suitable electronic data storage. VoIP phone 950 is configured to establish communications link with a VoIP network (not shown) via Wi-Fi communication module 966.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for detecting a periodic portion of a preamble of a data unit, the method comprising:
    generating angle information based on a complex signal corresponding to a received communication signal;
    generating an autocorrelation signal based on the angle information, wherein generating the autocorrelation signal includes
        generating a first multiplication signal by subtracting, from the angle information, a delayed-by-N version of the angle information, wherein N is an integer indicative of a period of the periodic portion,
        generating a second multiplication signal by subtracting, from the delayed-by-N version of the angle information, a delayed-by-2N version of the angle information;
        converting the first multiplication signal to a first complex multiplication signal having two components,
        converting the second multiplication signal to a second complex multiplication signal having two components, and
        generating the autocorrelation signal using the first complex multiplication signal and the second complex multiplication signal; and
    determining whether the periodic portion is present in the complex signal based on the autocorrelation signal.

2. A method according to claim 1, wherein generating the autocorrelation signal comprises subtracting the second complex multiplication signal from the first complex multiplication signal.

3. A method according to claim 2, wherein generating the autocorrelation signal comprises accumulating the subtraction of the second complex multiplication signal from the first complex multiplication signal.

4. A method according to claim 1, further comprising detecting a start of the periodic portion based on the autocorrelation signal.

5. A method according to claim 4, further comprising detecting an end of the periodic portion based on the autocorrelation signal.

6. A system for detecting a periodic portion of a preamble of a data unit, the system comprising:
    an angle quantizer having an input and an output, wherein the input of the angle quantizer is configured to receive a complex signal having a periodic portion;
    an autocorrelator having an input coupled to the output of the angle quantizer, wherein the autocorrelator is configured to generate an autocorrelation signal i) based on the output of the angle quantizer, and ii) not based on magnitude information associated with the complex signal, and wherein the autocorrelator includes
        a delay line configured to store angle information from the angle quantizer,
        a first adding device coupled to the delay line, wherein the first adding device is configured to subtract, from the angle information, a delayed-by-N version of the angle information, wherein N is an integer indicative of a period of the periodic portion,
        a second adding device coupled to the delay line, wherein the second adding device is configured to subtract, from the delayed-by-N version of the angle information, a delayed-by-2N version of the angle information, wherein N is an integer indicative of a period of the periodic portion;

a first polar-to-rectangular converter having an input coupled to an output of the first adding device, and a second polar-to-rectangular converter having an input coupled to an output of the second adding device, wherein the autocorrelator is configured to generate the autocorrelation signal using i) an output of the first polar-to-rectangular converter, and ii) an output of the second polar-to-rectangular converter; and a detector having an input coupled to an output of the autocorrelator, wherein the detector is configured to detect the periodic portion based on the autocorrelation signal.

7. A system according to claim 6, wherein the autocorrelator comprises a third adding device configured to i) add an output of the first polar-to-rectangular converter with a delayed version of the autocorrelation signal, and ii) subtract an output of the second polar-to-rectangular converter.

8. A system according to claim 7, wherein the autocorrelator further comprises a complex signal delay element configured to generate the delayed version of the autocorrelation signal.

9. A system according to claim 6, wherein the detector is configured to detect when a magnitude of the output of the autocorrelator exceeds a threshold.

10. A system according to claim 9, wherein the detector is further configured to subsequently detect when the magnitude of the output of the autocorrelator falls below the threshold.

11. A method for detecting a periodic portion of a preamble of a data unit, the method comprising:

generating a plurality of angle information signals based on a plurality of complex signals, wherein the plurality of complex signals correspond to a plurality of antennas of a receiver;

generating a plurality of autocorrelation signals based on the plurality of angle information signals, wherein generating each autocorrelation signal includes generating a first multiplication signal by subtracting, from the angle information, a delayed-by-N version of the angle information, wherein N is an integer indicative of a period of the periodic portion, generating a second multiplication signal by subtracting, from the delayed-by-N version of the angle information, a delayed-by-2N version of the angle information, converting the first multiplication signal to a first complex multiplication signal having two components, converting the second multiplication signal to a second complex multiplication signal having two components, and generating the autocorrelation signal based on the first complex multiplication signal and the second complex multiplication signal;

wherein the method further comprises summing the plurality of autocorrelation signals to generate a summed autocorrelation signal, and detecting the periodic portion based on the summed autocorrelation signal.

12. A method according to claim 11, wherein generating each autocorrelation signal comprises subtracting the second complex multiplication signal from the first complex multiplication signal.

13. A method according to claim 12, wherein generating each autocorrelation signal comprises accumulating the subtraction of the second complex multiplication signal from the first complex multiplication signal.

14. A method according to claim 11, further comprising detecting a start of the periodic portion based on the summed autocorrelation signal.

15. A method according to claim 14, further comprising detecting an end of the periodic portion based on the summed autocorrelation signal.

16. A system for detecting a periodic portion of a preamble of a data unit, the system comprising:

a plurality of angle quantizers, each angle quantizer having an input configured to receive a corresponding complex signal corresponding to a respective antenna of a plurality of antennas;

a plurality of autocorrelators, each autocorrelator having an input coupled to an output of a corresponding one of the angle quantizers, wherein each autocorrelator is configured to generate a respective autocorrelation signal i) based on the output of the corresponding angle quantizer, and ii) not based on magnitude information associated with the complex signal, wherein each autocorrelator includes a delay line to store angle information from the corresponding angle quantizer, a first adding device coupled to the delay line, the first adding device to subtract, from the angle information, a delayed-by-N version of the angle information, wherein N is an integer indicative of a period of the periodic portion, a second adding device coupled to the delay line, the second adding device to subtract, from the delayed-by-N version of the angle information, a delayed-by-2N version of the angle information, wherein N is an integer indicative of a period of the periodic portion, a first polar-to-rectangular converter having an input coupled to an output of the first adding device, and a second polar-to-rectangular converter having an input coupled to an output of the second adding device;

wherein each autocorrelator is configured to generate the respective autocorrelation signal using i) an output of the first polar-to-rectangular converter, and ii) an output of the second polar-to-rectangular converter, and wherein the system further comprises a summing device coupled to the plurality of autocorrelators, wherein the summing device is configured to add the outputs of the autocorrelators to generate a summed autocorrelation signal, and a detector having an input coupled to an output of the summing device, wherein the detector is configured to detect the periodic portion based on the summed autocorrelation signal.

17. A system according to claim 16, wherein each autocorrelator comprises a third adding device i) to add an output of the first polar-to-rectangular converter with a delayed version of the respective autocorrelation signal, and ii) to subtract an output of the second polar-to-rectangular converter.

18. A system according to claim 17, wherein each autocorrelator further comprises a complex signal delay element to generate the delayed version of the respective autocorrelation signal.

19. A system according to claim 16, wherein the detector is configured to detect when a magnitude of the summed autocorrelation signal exceeds a threshold.

20. A system according to claim 19, wherein the detector is further configured to subsequently detect when the magnitude of the summed autocorrelation signal falls below the threshold.

* * * * *